(12) United States Patent
Haham et al.

(10) Patent No.: US 7,890,476 B2
(45) Date of Patent: Feb. 15, 2011

(54) DATA GENERATOR APPARATUS FOR TESTING DATA DEPENDENT APPLICATIONS, VERIFYING SCHEMAS AND SIZING SYSTEMS

(75) Inventors: Uri Haham, Karkur (IL); Ronen Cohen, Nahariya (IL); Eyal Mush, Qiryat-Motzkin (IL)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/772,461

(22) Filed: May 3, 2010

(65) Prior Publication Data

US 2010/0211825 A1 Aug. 19, 2010

Related U.S. Application Data

(63) Continuation of application No. 11/735,966, filed on Apr. 16, 2007, now Pat. No. 7,739,249.

(51) Int. Cl.
G06F 17/30 (2006.01)
(52) U.S. Cl. .................. 707/690; 707/736; 707/803
(58) Field of Classification Search .......... 707/999.101, 707/999.102, 999.103, 999.104, 690, 736, 707/803
See application file for complete search history.

(56) References Cited

U.S. PATENT DOCUMENTS

| | | | | |
|---|---|---|---|---|
| 6,279,008 B1 * | 8/2001 | Tung Ng et al. | .................... | 1/1 |
| 6,754,666 B1 * | 6/2004 | Brookler et al. | ..................... | 1/1 |
| 6,944,627 B2 * | 9/2005 | Zhang et al. | ........................ | 1/1 |
| 7,054,877 B2 * | 5/2006 | Dettinger et al. | ............ | 707/718 |
| 7,194,479 B1 * | 3/2007 | Packham | ..................... | 717/124 |
| 7,262,773 B2 * | 8/2007 | Couckuyt et al. | ........... | 345/440 |
| 7,603,438 B2 * | 10/2009 | Daos et al. | .................. | 709/219 |
| 2002/0040359 A1 * | 4/2002 | Green et al. | ................... | 707/3 |

* cited by examiner

*Primary Examiner*—James Trujillo
*Assistant Examiner*—Jorge A Casanova
(74) *Attorney, Agent, or Firm*—Buckley, Maschoff & Talwalkar LLC

(57) ABSTRACT

A data generator for database schema verification, system sizing and functional test of data dependent applications. Allows for generation of data from random values or from working databases which may be profiled to generate patterns for occurrences of values and sizes of values. The data may be filled with a fill rate that dictates the percentage of fields assigned nulls. Cardinality allows for a fixed number of values to occur across the records for a field. May utilize reference data associated with an existing database to fill fields. Qualifiers and multi-value fields may be filled to mimic real data. Maximum, nominal and average number of occurrences of sizes of data and qualifiers and multi-value data may be specified. May also utilize dictionaries to fill. Hierarchical levels and number of child nodes may also be specified and used in filling taxonomy tables and hierarchy tables for example.

15 Claims, 11 Drawing Sheets

MDM Data Generator Configuration

300

Tables Properties

| Table Name | Table Type | No. of Rows | No. of Hier. Levels | No. of Child Nodes |
|---|---|---|---|---|
| Business Partners | Main | # | 0 | 0 |
| Countries | Flat | # | 0 | 0 |
| Languages | Flat | # | 0 | 0 |
| Partner Titles | Flat | # | 0 | 0 |
| Partner Types | Flat | # | 0 | 0 |
| Regions | Hierarchy | # | 1 | 1 |
| Tax Numbers | Qualified Fla | # | 0 | 0 |
| Account Groups | Flat | # | 0 | 0 |
| Addresses | Qualified Fla | # | 0 | 0 |
| Address Usages | Flat | # | 0 | 0 |
| Categories | Taxonomy | # | 1 | 1 |
| Business Partner Role | Flat | # | 0 | 0 |
| Images | Image | # | 0 | 0 |
| Text Blocks | Text Block | # | 0 | 0 |
| Text HTMLs | Text HTML | # | 0 | 0 |
| PDFs | PDF | # | 0 | 0 |

Fields Properties

| Table Name | Field Name | Field Type | Is Unique | Fill Rate | Cardinality | No. of Multivalues | Multivalue's Ratings | No. of Qualified Links | Qualified Links Ratings |
|---|---|---|---|---|---|---|---|---|---|
| Business Partners | MDM Partner ID | Auto ID | N | 100 | 100 | 1 | Nominal | 1 | Nominal |
| Business Partners | Partner Number | Text | N | 100 | 100 | 1 | Nominal | 1 | Nominal |
| Business Partners | Full Name | Text | N | 100 | 100 | 1 | Nominal | 1 | Nominal |
| Business Partners | Full Address | Text | N | 100 | 100 | 1 | Nominal | 1 | Nominal |
| Business Partners | Category | Lookup [Taxonomy] | N | 100 | 100 | 1 | Nominal | 1 | Nominal |
| Business Partners | Partner Title | Lookup [Flat] | N | 100 | 100 | 1 | Nominal | 1 | Nominal |
| Business Partners | Name 1/Last Name | Text | N | 100 | 100 | 1 | Nominal | 1 | Nominal |
| Business Partners | Name 2/First Name | Text | N | 100 | 100 | 1 | Nominal | 1 | Nominal |
| Business Partners | Name 3/Middle Name | Text | N | 100 | 100 | 1 | Nominal | 1 | Nominal |
| Business Partners | Name 4/Birth Name | Text | N | 100 | 100 | 1 | Nominal | 1 | Nominal |
| Business Partners | House Number | Text | N | 100 | 100 | 1 | Nominal | 1 | Nominal |
| Business Partners | Street | Text | N | 100 | 100 | 1 | Nominal | 1 | Nominal |
| Business Partners | Apartment | Text | N | 100 | 100 | 1 | Nominal | 1 | Nominal |
| Business Partners | City | Text | N | 100 | 100 | 1 | Nominal | 1 | Nominal |
| Business Partners | Region | Lookup [Hierarchy] | N | 100 | 100 | 1 | Nominal | 1 | Nominal |
| Business Partners | Postal Code | Text | N | 100 | 100 | 1 | Nominal | 1 | Nominal |
| Business Partners | Country | Lookup [Flat] | N | 100 | 100 | 1 | Nominal | 1 | Nominal |

Figure 5

| Table Name | Field Name | Field Type | is Unique | Fill Rate | Cardinality | No. of Multivalues | Multivalue's Ratings | No. of Qualified Links | Qualified Links Ratings |
|---|---|---|---|---|---|---|---|---|---|
| Business Partners | MDM Partner ID | Auto ID | Y | 100 | 100 | 1 | Nominal | 1 | Nominal |
| Business Partners | Partner Number | Text | N | 100 | 100 | 1 | Nominal | 1 | Nominal |
| Business Partners | Full Name | Text | N | 100 | 100 | 1 | Nominal | 1 | Nominal |
| Business Partners | Full Address | Text | N | 100 | 100 | 1 | Nominal | 1 | Nominal |
| Business Partners | Category | Lookup [Taxonomy] | N | 100 | 100 | 1 | Nominal | 1 | Nominal |
| Business Partners | Partner Title | Lookup [Flat] | N | 100 | 100 | 1 | Nominal | 1 | Nominal |
| Business Partners | Name 1/Last Name | Text | N | 100 | 100 | 1 | Nominal | 1 | Nominal |
| Business Partners | Name 2/First Name | Text | N | 100 | 100 | 1 | Nominal | 1 | Nominal |
| Business Partners | Name 3/Middle Name | Text | N | 100 | 100 | 1 | Nominal | 1 | Nominal |
| Business Partners | Name 4/Birth Name | Text | N | 100 | 100 | 1 | Nominal | 1 | Nominal |
| Business Partners | House Number | Text | N | 100 | 100 | 1 | Nominal | 1 | Nominal |
| Business Partners | Street | Text | N | 100 | 100 | 1 | Nominal | 1 | Nominal |
| Business Partners | Apartment | Text | N | 100 | 100 | 1 | Nominal | 1 | Nominal |
| Business Partners | City | Text | N | 100 | 100 | 1 | Nominal | 1 | Nominal |
| Business Partners | Region | Lookup [Hierarchy] | N | 100 | 100 | 1 | Nominal | 1 | Nominal |
| Business Partners | Postal Code | Text | N | 100 | 100 | 1 | Nominal | 1 | Nominal |
| Business Partners | Country | Lookup [Flat] | N | 100 | 100 | 1 | Nominal | 1 | Nominal |
| Business Partners | PO Box | Text | N | 100 | 100 | 1 | Nominal | 1 | Nominal |

Figure 6

| | | | | | | | | |
|---|---|---|---|---|---|---|---|---|
| Business Partners | Apartment | Text | N | 100 | 100 | 1 | Nominal | 1 | Nominal |
| Business Partners | City | Text | N | 100 | 100 | 1 | Nominal | 1 | Nominal |
| Business Partners | Region | Lookup [Hierarchy] | N | 100 | 100 | 1 | Nominal | 1 | Nominal |
| Business Partners | Postal Code | Text | N | 100 | 100 | 1 | Nominal | 1 | Nominal |
| Business Partners | Country | Lookup [Flat] | N | 100 | 100 | 1 | Nominal | 1 | Nominal |
| Business Partners | PO Box | Text | N | 100 | 100 | 1 | Nominal | 1 | Nominal |
| Business Partners | Address Usage | Lookup [Flat] (multi-valued) | N | 100 | 100 | 5 | Nominal | 1 | Nominal |
| Business Partners | Phone Number | Text | N | 100 | 100 | 1 | Nominal Average | 1 | Nominal |
| Business Partners | Mobile Phone Number | Text | N | 100 | 100 | 1 | Nominal | 1 | Nominal |
| Business Partners | Fax Number | Text | N | 100 | 100 | 1 | Nominal | 1 | Nominal |
| Business Partners | E-mail Address | Text | N | 100 | 100 | 1 | Nominal | 1 | Nominal |
| Business Partners | Search Term 1 | Text | N | 100 | 100 | 1 | Nominal | 1 | Nominal |
| Business Partners | Search Term 2 | Text | N | 100 | 100 | 1 | Nominal | 1 | Nominal |
| Business Partners | Language | Lookup [Flat] | N | 100 | 100 | 1 | Nominal | 1 | Nominal |
| Business Partners | Partner Type | Lookup [Flat] | N | 100 | 100 | 1 | Nominal | 1 | Nominal |
| Business Partners | Role | Lookup [Flat] (multi-valued) | N | 100 | 100 | 1 | Nominal | 1 | Nominal |

DATA GENERATOR APPARATUS FOR TESTING DATA DEPENDENT APPLICATIONS, VERIFYING SCHEMAS AND SIZING SYSTEMS

This application is a continuation of application Ser. No. 11/735,966, filed Apr. 16, 2007 now U.S. Pat. No. 7,739,249. The patent application identified above is incorporated here by reference in its entirety to provide continuity of disclosure.

BACKGROUND OF THE INVENTION

1. Field of the Invention

Embodiments of the invention described herein pertain to the field of computer systems. More particularly, but not by way of limitation, one or more embodiments of the invention enable a data generator apparatus for testing data dependent applications, verifying schemas and sizing systems.

2. Description of the Related Art

Data dependent applications require data to operate on. The data cannot be completely random but rather, must be valid as expected by the business logic of a data dependent application. The simplest method for testing a data dependent application such as a database application is to manually enter data into a database and test the data dependent application with that data. Manually entering data is a laborious process when attempting to provide enough data to fully test a complex enterprise level database application. For complex applications that involve hundreds of tables and fields and millions of records, it is not practical to manually populate a database with test data due to the sheer magnitude labor required. In addition, the accuracy rate for manual data entry is an issue. For example, if 40 percent of the records in a table in a database are to utilize a post office box, it is difficult to ensure that manual entry of the data will achieve this. To avoid manual typing of data, data generators have been employed to seed a database with data.

Data generators are utilized to automate the process of filling data structures such as databases with data. Not only are data generators used for testing data dependent applications. Use of a data generator greatly increases the amount of data that may be generated in a given amount of time versus manual entry. There are currently no known database generators that provide a full range of data generation for complex database schema verification, system hardware sizing and functional test of data dependent applications.

Regardless of the method used to populate a database, i.e., whether manual or automated, a data model design or schema, cannot be considered valid without populating and testing the schema with valid data. A data dependent application similarly cannot be expected to work properly unless tested on data that is representative of the data that will be processed when the application is introduced. There are no known data generators that randomize fields while keeping the characteristics of the fields within the profile of an operational database without directly copying the data in the operational database.

Likewise, system hardware procurement requires accurate system sizing to determine the amount of hardware required to handle a particular database application. Current system sizing estimates are generally performed in a rudimentary manner since they do not utilize data that is representative of the data that will eventually inhabit a database. Since only poor estimates of ultimate system performance are possible, hardware purchases are generally larger than needed to accommodate the poor hardware estimates. No known data generator addresses all of the verification, sizing and testing issues as described herein.

There are no known data generators that take a holistic approach to a database as a whole and populate the database in an intelligent manner. Known data generators take an individual table approach to the data generation process. For example, there are no known data generators that can handle complex schemas and support average, maximum and/or fixed percentages of values or value types including qualifiers and multi-valued fields as observed or profiled in an operational database. Current data generators fail to mimic values and sizes and percentages of values and complex data structures in an operational database and hence are incapable of being used to validate a schema, calculate system hardware requirements and fully test data dependent applications.

DTM Data Generator is one data generator that allows for generating values for a database, but does not allow for entry of cardinality, fill rate, maximum, nominal and average values, or complex data types such as qualifiers. In addition, the tool does not allow for profiling information to mimic the size and format of data in an operational database. Rather, the tool is silent on the use of qualifiers and uses an external database verbatim for filling fields. Furthermore, there is no disclosure of the filling of multi-value fields that hold more than one value for a particular field.

EMS Data Generator and GSApps Data Generation Tool likewise have similar limitations and do not address all facets of schema verification, data dependent application testing and system sizing. For example, neither tool allows for specification of maximum, nominal and average values for data fields or the filling of complex data types such as qualifiers. These tools are further examples of tools that are designed to place raw data into a database without regards to the full range of schema validation or data dependent application testing or system hardware sizing.

For at least the limitations described above there is a need for a data generator for database schema verification, system sizing and functional test of data dependent applications.

BRIEF SUMMARY OF THE INVENTION

One or more embodiments of the invention enable a data generator apparatus for testing data dependent applications, verifying schemas and sizing systems. Embodiments of the invention allow for the generation of data using a holistic approach to the database as a whole as opposed to an individual table approach. For example, a working database may be profiled to generate patterns for occurrences of values and sizes or numbers of values for fields in the database. The data may be filled with a fill rate that dictates that a percentage of the records are assigned a null or non-null field value. In addition, a cardinality value may be entered for fields that allows for a fixed number of values to occur across the records for a given field.

One or more embodiments of the invention allow for reference data associated with an existing database to be used as fill values for a field. Thus, actual values for lookup tables can be utilized if desired. Furthermore, complex data types such as qualifiers and multi-value fields may be filled to mimic real world scenarios. Qualifiers allow for raw data to be broken into primary data tables and lookup tables using qualifier fields. Qualifier fields represent sparsely populated values in the raw data. The use of qualifiers saves tremendous amounts of space in a database. Maximum, nominal and average number of occurrences of qualifiers and multi-value data may also be specified. These represent the maximum, fixed and average number of sparse fields and multiple values per field respectively. Maximum, nominal and average number of occurrences of qualifiers and multi-value data may also be specified. Maximum, nominal and average sizes for fields may likewise be specified. Embodiments of the invention may also utilize dictionaries to fill text based entries, either randomly or within a range for example. In addition, fields may be assigned to domains that signify that a given field belonging to a given domain is to use a dictionary associated with the domain from which to obtain values. Hierarchical levels and number of child nodes may also be specified and used in filling taxonomy tables and hierarchy tables for example.

Embodiments of the invention may utilize multi-CPU servers and multi-threading implementations to generate data in parallel, thereby speeding the generation process. Any type of hardware may be utilized to host an embodiment of the invention from single CPU systems to multi-CPU servers.

In one or more embodiments of the invention computer program code is utilized to implement data generator. The computer program code is configured to connect to a database and obtain an existing schema associated with the database. In this example, the database has a number of tables T, which can be any number greater than zero. The computer program code presents a schema interface via a presentation layer which is displayed on a computer interface.

The existing schema associated with a database is displayed in the schema interface on the computer interface. The computer program code accepts a number of records N to generate for each desired table. For each desired field to fill for each record the computer program product accepts a cardinality C for a field and a fill rate FR for the field.

The computer program product obtains profiling information for the field from a second database and any desired reference data for any other fields to fill. In one embodiment the minimum, maximum and average size of a field, qualifier or multi-value field is profiled from a second database and used to randomize data in the first database.

The computer program product sets up any qualifiers and multi-value fields according to the profile and then generates data. The Number of records having the first field are generated with cardinality C, fill rate FR, and utilizing the profiling information obtained from the second database. In addition, the second field filled with data selected from the reference data is filled for each record along with any multi-value fields. Alternatively and/or in addition, the first field may belong to a domain that uses an associated dictionary to obtain values from. Any combination of use of a second database or domain any associated dictionary is in keeping with the spirit of the invention. For example, a "Last Name" field may belong to a domain called "names" which utilizes a dictionary of names from which to obtain values, e.g., randomly. A domain of "key" for example allows a field to be filled with a pattern using numeric or alphanumeric characters for example. In one or more embodiments a field may be designated as a random, dictionary or domain field for the purpose of filling the field. A default value of random (or any of the other possible data source values) may be utilized in one or more embodiments so that the user only has to specify source values for desired fields.

One or more embodiments of the invention display status during generation for a user to observe. Other steps may be included to account for other elements as described herein.

BRIEF DESCRIPTION OF THE DRAWINGS

The above and other aspects, features and advantages of the invention will be more apparent from the following more particular description thereof, presented in conjunction with the following drawings wherein:

FIG. 3 shows an embodiment of the data generator configuration screen.

FIG. 5 shows an enlarged view of the "Fields' Properties" window of the data generator configuration screen.

FIG. 6 shows the setting of the "Multi-Value Ratings" for a field.

FIG. 9 shows an embodiment of the data generator status window showing real-time status as the data generator creates portions of the database.

FIG. 11 shows the list of records generated and in addition shows the generated country names.

DETAILED DESCRIPTION

A data generator apparatus for testing data dependent applications, verifying schemas and sizing systems will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
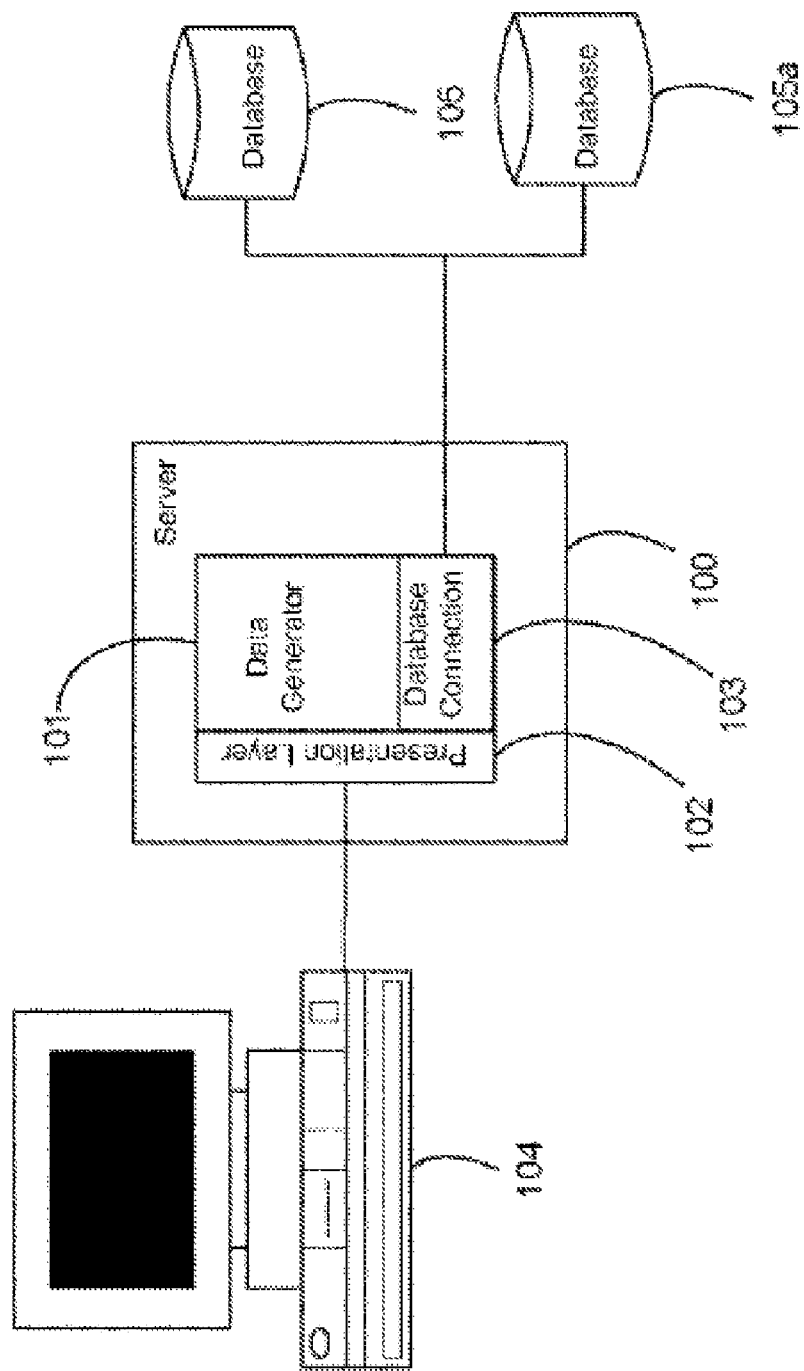
FIG. 1 is an architectural diagram of the apparatus.

FIG. 1 is an architectural diagram of server 100 hosting data generator 101 configured to generate data to insert in database 105. Data is generated for database schema verification, system sizing and functional testing of data dependent applications. Input from computer interface 104 and output to computer interface 104 occurs through presentation layer 102 coupled with data generator 101. Database connector layer 103 enables communication with databases 105 and 105a and may be implemented as a separate module or a third party database interface may be utilized so long as databases 105 and 105a are accessible to data generator 101. Data generator 101 may be multi-threaded and may take advantage of multiple central processing units on server 100 if server 100 is so equipped. Database 105a represents an existing database that is utilized to obtain reference data and profile information regarding particular field values. For example, a working database may be profiled to generate patterns for occurrences of values and sizes of values for fields in the database. The sizes of data values in fields and variation in sizes of data in fields may be obtained and used to generate dummy data in database 105 that varies in the same manner. For example, if the data in working database 105a contains a field named "address" that has a maximum length value of 28 characters across all rows of a table in database 105a and has an average length of 17 characters, then random data with these characteristics may be generating for database 105 according to this profile. Likewise, the profile may be utilized to determine the percentage of field values across all records that are not null for a given field. This profile characteristic is known as the fill rate. If the fill rate is 60%, then 60% of the values for a particular field are generated and the other 40% are set to NULL. In addition, a cardinality value may be entered for fields that allows for a fixed number of values to occur across the records. One or more embodiments of the invention allow for reference data associated with an existing database to be used as fill values for a field. The reference data may be obtained from existing database 105a or may be loaded from any other source. Thus, actual values for lookup tables can be utilized if desired. Furthermore, complex data types such as qualifiers and multi-value fields may be filled to mimic real world scenarios.

Qualifiers allow for raw data to be broken into primary data tables and lookup tables using qualifier fields. Qualifier fields can be automatically selected or manually selected from raw data tables and these fields represent sparsely populated values in the raw data. The use of qualifiers saves tremendous amounts of space in a database. Although there is an introduced level of indirection, the cost in performance for traversing the indirection is low compared to the amount of memory saved for sparsely generated fields. Any level of indirection that places sparse values in separate tables indexed by qualifiers may be utilized in generating data with embodiments of the invention. Maximum, nominal and average number of occurrences of qualifiers and multi-value data may also be specified. These represent the maximum, fixed and average number of sparse fields and multiple values per field respectively. Maximum, nominal and average sizes for fields may likewise be specified in other embodiments of the invention. Embodiments of the invention may also utilize dictionaries to fill text based entries, either randomly or within a range for example. Hierarchical levels and number of child nodes may also be specified and used in filling taxonomy tables and hierarchy tables for example.

Figure 2:
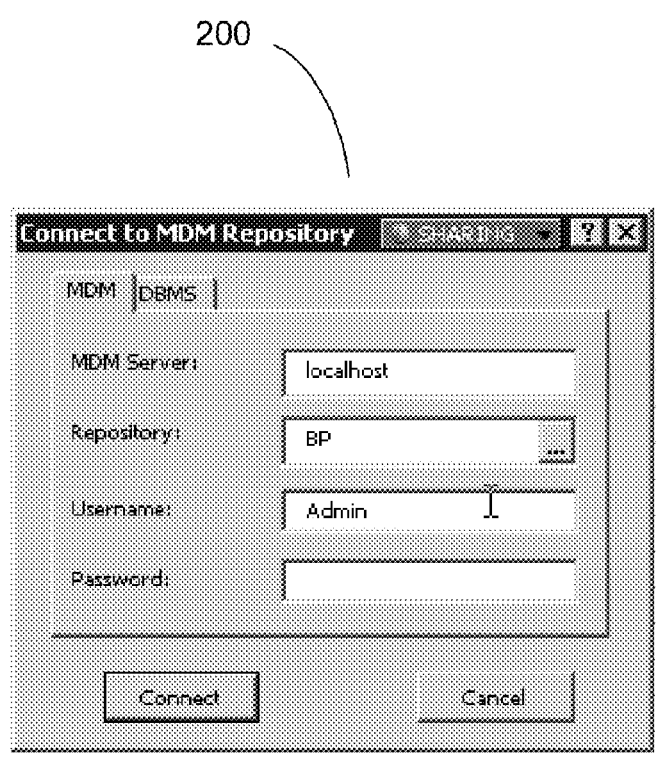
FIG. 2 shows a connection window for connecting to a database.

FIG. 2 shows connection window 200 for connecting to a database. In this figure, the server name, repository with the server and username and password are accepted by the system and utilized to connect with a particular database that is to be filled. This window may also be utilized to connect to a secondary database where profiling information may be obtained for desired fields. The profiling information may include the average, minimum and maximum sizes of data in a field for example. Other types of profiling information may include the percentages of particular values or the cardinality of the values in a field, so that randomized data may be generated to match the characteristics of the data without utilizing an exact copy of the data. An exact copy of the data cannot be utilized in general to find errors that depend on data since the operational database is assumed to work correctly on the data within it. However, when attempting to fully test a new database application, while still providing accurate estimates for system sizing and data for schema verification, randomizing data that has the same characteristics of real data provides excellent testing data.

FIG. 3 shows an embodiment of data generator configuration screen 300. In this figure, four windows are shown. The four windows shown are the "General Settings" window, the "Taxonomy Attributes" window, the "Fields' Properties" window and the "Tables' Properties" window. The "General Settings" window includes the number of threads to utilize in running embodiments of the invention. For servers with multiple processors, this setting may be utilized to greatly speed the data generation process as the individual threads may run in parallel.

In one or more embodiments, the Java programming language is utilized to implement the data generator so that the data generator may run on any operating system or any type of computer since the Java Virtual Machine is ubiquitous. The "Taxonomy Attributes" window allows for the entry of the maximum number of attributes and the maximum number of values per attribute. Attributes allow for the overlay of families onto a hierarchy for example. The "Fields' Properties" window shows the fields for the current table of the "Tables' Properties" window. In this figure, the "Business Partners" table is shown in the "Fields' Properties" window as a default. Each field in the "Fields' Properties" window is associated with a field name, type and has characteristics such as "Unique", "Fill Rate", "Cardinality", "Number of Multi-Values", "Multi-Values Ratings", "Number of Qualified Links" and "Qualified Links Ratings". Optionally, a secondary database name and field name and/or domain name (for use with an associated dictionary) may be included in this view. Alternatively, popup menus or any other type of user interface element may be utilized to specify the source of data for a desired field. Furthermore, any type of interface may be utilized in setting the configuration settings for data generation including but not limited to web based interface, spreadsheet based interface or custom program interface or any other type of interface employing any type of graphical user interface elements capable of accepting input to alter settings to those desired.

Figure 4:
FIG. 4 shows an enlarged view of the "Tables' Properties" window of the data generator configuration screen.

FIG. 4 shows an enlarged view of the "Tables' Properties" window 400 of the data generator configuration screen. In this figure the tables are listed in the leftmost column, with the type in the next right column and the "Number of Rows", "Number of Hierarchical Levels" and "Number of Child Nodes" shown in successive columns toward the right in the figure. Embodiments of the invention may set up any number of hierarchical levels in a table, and with the fields that signify the hierarchy stored in a separate taxonomy or family table, efficient hierarchies may be formed. Likewise, the specification of more attributes/fields to signify more layers of hierarchy may also be entered to signify the number of child nodes.

FIG. 5 shows an enlarged view of the "Fields' Properties" window 500 of the data generator configuration screen. For a selected table in the "Tables' Properties" window of the data generator configuration screen, this window shows each field name and field type as listed above in the description of FIG. 3. The "Number" fields (for Multi-Values and Qualified Links) allow for the entry of a number to utilize in setting the field while the "Rating" fields allow for the entry of "Nominal", "Average" or "Maximum" ratings that control how the "Numbers" field is utilized. For example if the Rating "Average" is selected, then a Number of Multi-Values of 3 will result in the generation of an average 3 values per field for example, with some records generated with 4 and some having 2 values for the given field and so on. The same applies to qualifiers in that all aspects of the indirection may be controlled to create a representation of the schema that meets the desired settings. Again, a secondary database name and field name and/or domain name (for use with an associated dictionary) may be included in this view to allow the use of external values to be directly specified in this view. For brevity, additional fields are not shown but are further described herein. Any other user interface element may be utilized to specify and display these settings. For example, the first row, "MDM Partner ID" may be specified as belonging to a "key" domain that allows for the specification of a regular expression such as "[A-Z][0-4][a-f](2)[1-9]" to generate patterns such as "B2ab7" to utilize as one random embodiment of an ID that matches that specified pattern. The pattern may be input in any manner, such as via a pop-up menu in one or more embodiments of the invention. In this or another embodiment, a domain name popup may be utilized to specify the domain to which a field belongs, and further to associate the field with a particular dictionary associated with the domain.

FIG. 6 shows the setting of the "Multi-Value Ratings" 600 for a field, in this case the "Address Usage" field of the "Business Partners" table. Since the field type is "Lookup [FLAT] (multi-valued)", the field may include multiple values. For example a multi-valued field with three values may be encoded as "office|business|work|lab|home" with a delimiter to indicate boundaries for the individual values. The setting of the "nominal" rating of 5 means that there will always be five values for the multi-value field. When generating data for the field, there may be profile information gathered from a second database for example that shows that the longest value in the multi-value field values "office|business|work|lab|home" is 8 characters long, i.e., the length of "business" and the shortest is 3 characters long. If profiling is selected for this field, then these characteristics may be utilized in randomizing data to fill the multi-value field with 5 values that vary within these characteristics.

Figure 7:
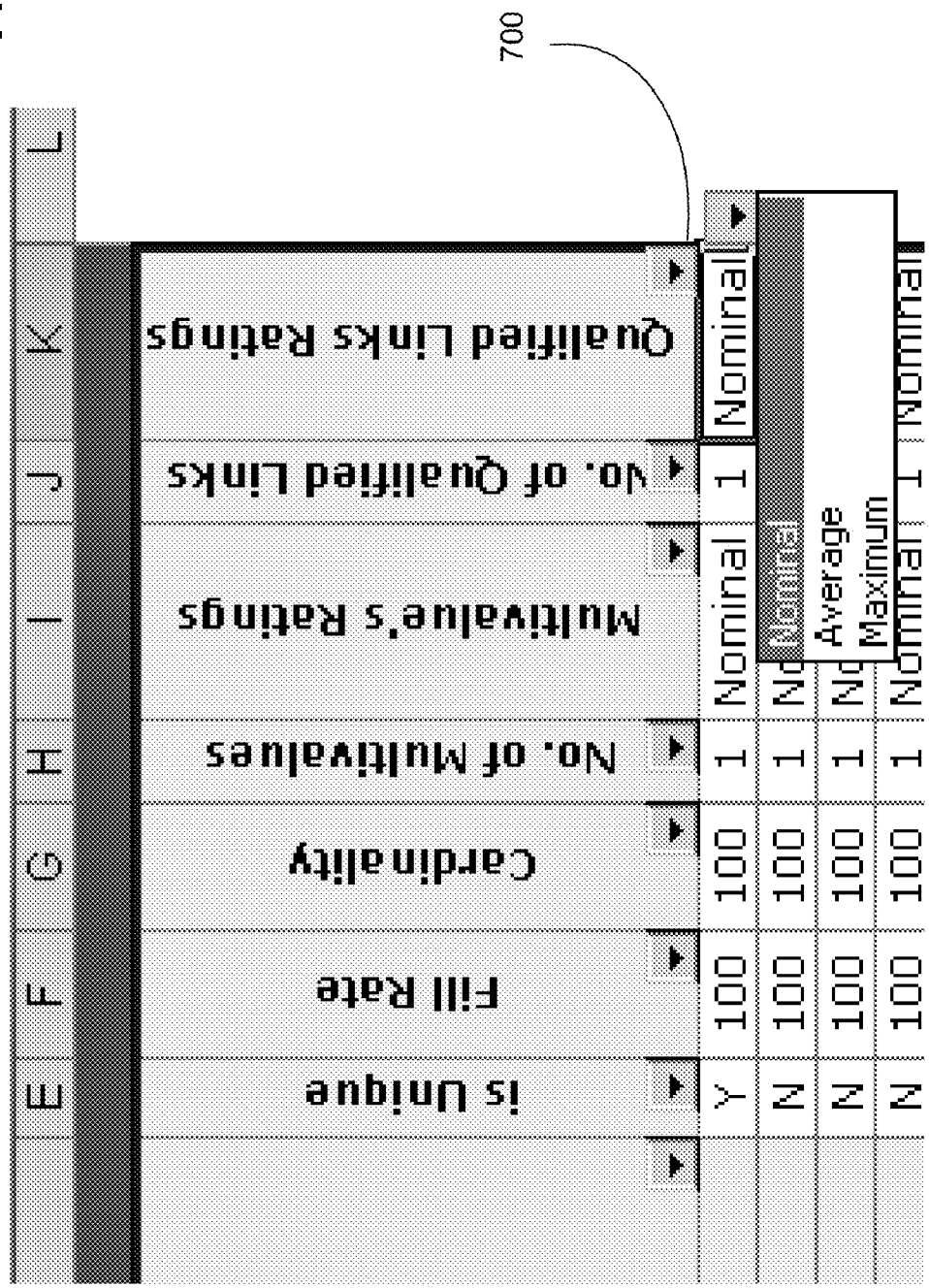
FIG. 7 shows the setting of the "Qualified Links Ratings" for a field.

FIG. 7 shows the setting of the "Qualified Links Ratings" 700 for a field. If the setting "Nominal" is chosen then the "Number of Qualified Links" is used verbatim. Hence a setting of 5 for qualified links with a setting of "Nominal" for the "Qualified Links Ratings" means that 5 qualified links will be generated. Likewise, if the "Average" setting is selected, then some qualified links may have more or less so long as they average 5. If the "Maximum" rating is selected, then 5 will be the maximum number of qualified links generated although some may generate as 4, 3, 2 or 1.

Figure 8:
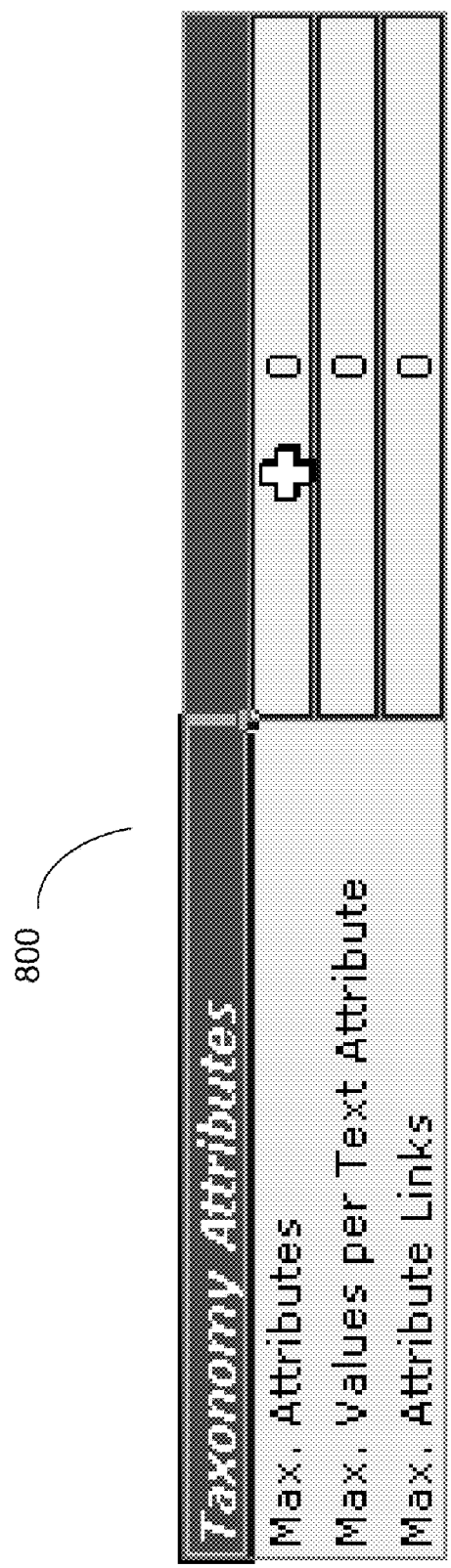
FIG. 8 shows an enlarged view of the "Taxonomy Attributes" window from the data generator configuration window.

FIG. 8 shows an enlarged view of the "Taxonomy Attributes" window 800 from the data generator configuration window. The taxonomy attributes is utilized to set the number of attributes that are utilized to define a hierarchy within the taxonomy. The "Maximum Values per Text Attribute" is utilized to set a high-end range for taxonomy attributes that are text based. The "Maximum Attribute Links" setting is utilized to set the maximum number of attribute links that are allowed for the generation of data.

Figure 9:
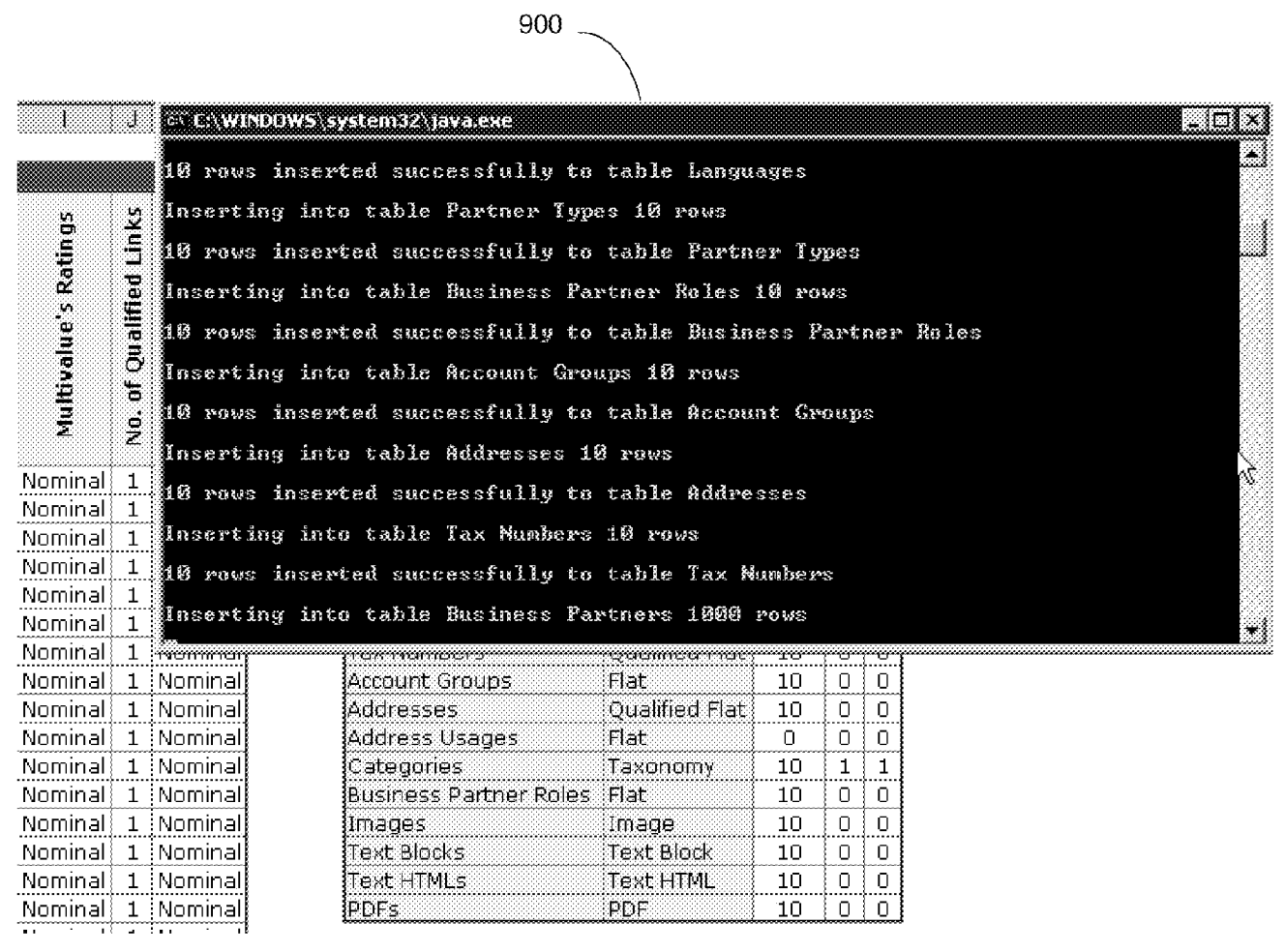

FIG. 9 shows an embodiment of the data generator status window 900 showing real-time status as the data generator creates portions of the database. As can be seen in the figure, status window 900 presents status while generating data for each table. Any other subdivision of showing status while the apparatus is operating is in keeping with the spirit of the invention including any use of graphics such as but not limited to pie charts, status bars, or any other type of graphical user interface element.

Figure 10:
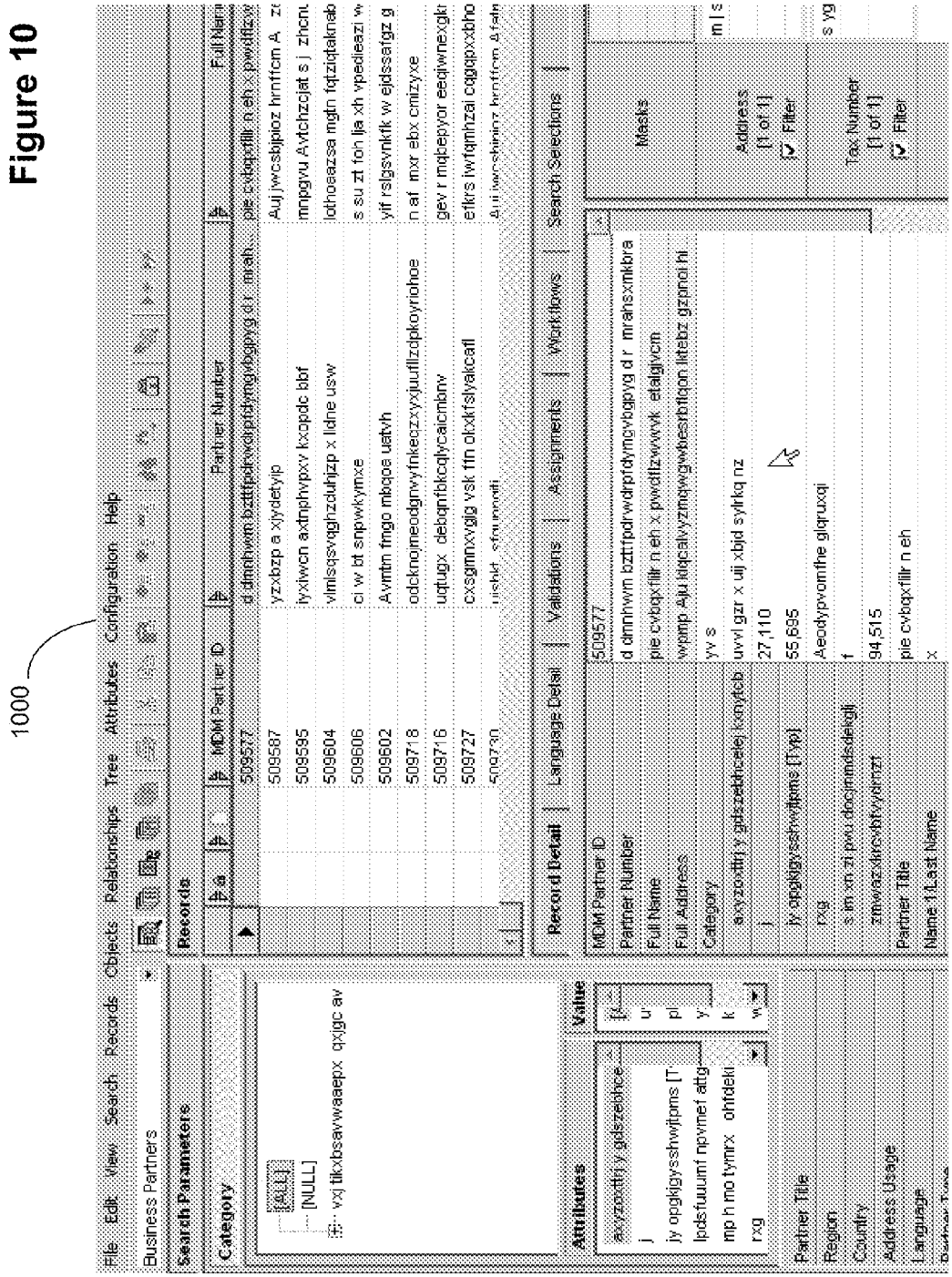
FIG. 10 shows a view of a list of records generated in the database and record detail for the first record as selected.

FIG. 10 shows a view of a list of records in window 1000 as generated in the database and also shows record detail for the first record as selected. The record detail as shown in the lower middle portion of the figure shows a mix of randomly generated fields such as "Full Name" and "Full Address" along with a field "MDM Partner ID" that may or may not be obtained from an operational database via a second connection using for example connection window 200 as shown in FIG. 2. By selecting any fields in the schema of the operational database to be profiled, embodiments of the invention may perform statistical analysis on the field to determine the minimum, maximum, average and sparseness of the values associated with the field for example. This profile information may then be utilized to generate random data that fits the characteristics of the fields for example. Reference fields may also be gathered from a second database and used as is. This allows for particular fields to exactly match the field values in an operational database if so desired.

Figure 11:
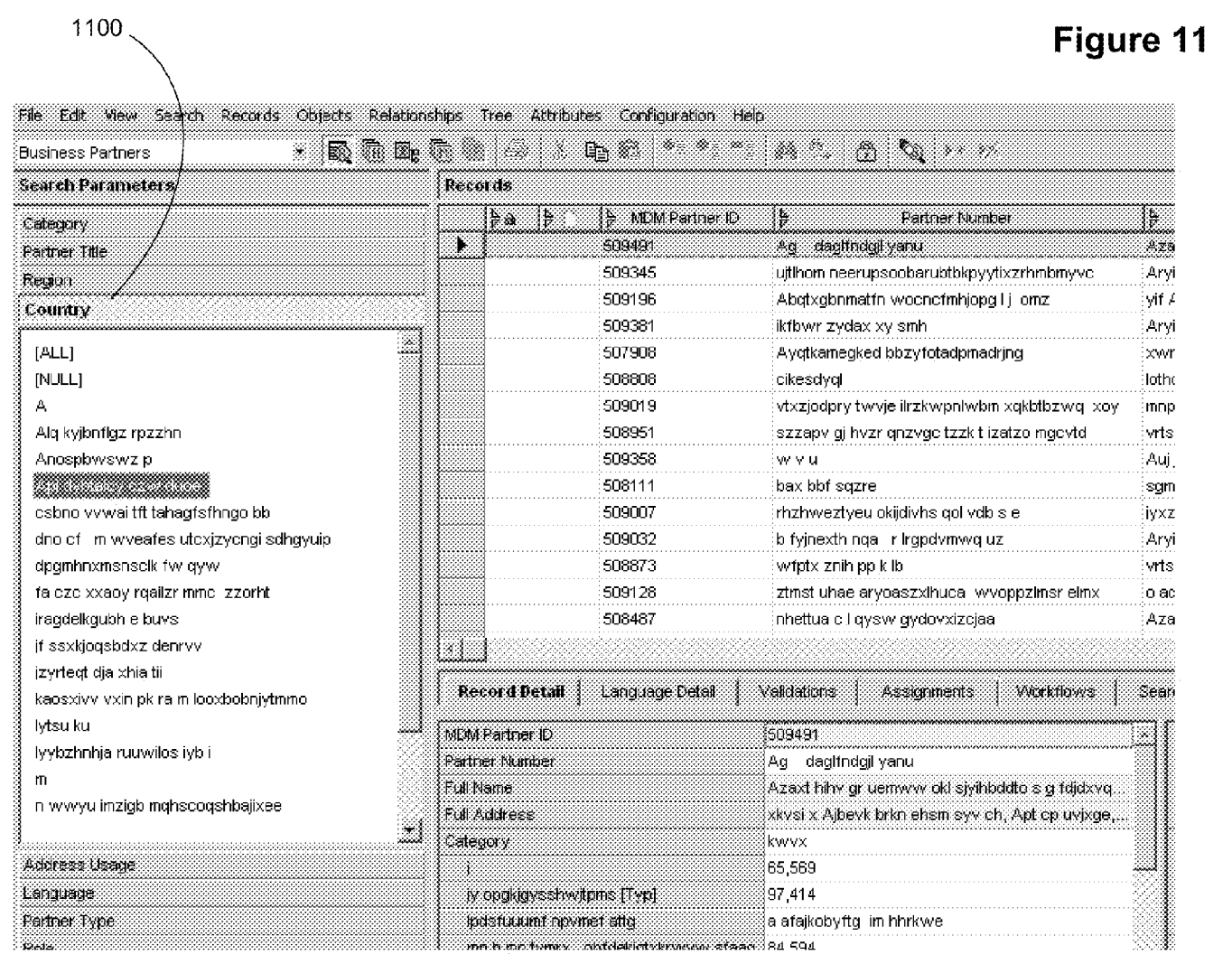

FIG. 11 shows the list of records generated and in addition shows the generated country names. In this figure, by selecting a parameter to search on which happens to be the "Country" field, it can be seen in the far left list in the figure that the country names are randomly generated. Again, the field names may be profiled from a second database that has operational data within it so as to keep the data as realistic in size and variation as possible while still utilizing random data. This allows for business logic testing that does not assume that all data is perfect and usually provides more thorough testing of data dependent code than is possible with known values that do not deviate from those expected.

In one or more embodiments of the invention computer program code is utilized to implement data generator 101. The computer program code is configured to connect to database 105 and obtain an existing schema associated with database 105. In this example, database 105 has a number of tables T, which can be any number greater than zero. The computer program code presents a schema interface via presentation layer 102 which is displayed on computer interface 104. The existing schema associated with database 105 is displayed in the schema interface on computer interface 104. The computer program code accepts a number of records N to generate for each desired table. For each desired field to fill for each record the computer program product accepts a cardinality C for a field and a fill rate FR for the field. The computer program product obtains profiling information for the field from second database 105a and any desired reference data for any other fields to fill. The computer program product sets up any qualifiers and multi-value fields according to the profile and then generates data. The Number of records having the first field are generated with cardinality C, fill rate FR, and utilizing the profiling information obtained from database 105a. In addition, the second field filled with data selected from the reference data is filled for each record along with any multi-value fields. One or more embodiments of the invention display status during generation for a user to observe. Other steps may be added to account for qualifiers or other elements as described herein.

While the invention herein disclosed has been described by means of specific embodiments and applications thereof, numerous modifications and variations could be made thereto by those skilled in the art without departing from the scope of the invention set forth in the claims.

What is claimed is:

1. A computer-implemented method for generating test data for testing data dependent applications, verifying schemas and sizing systems comprising:
   connecting to a first database;
   obtaining an existing schema associated with said first database comprising at least one table;
   connecting to a second database;
   obtaining profiling information from said second database comprising real data stored in said second database;
   performing a statistical analysis on at least one field of said second database for automatically determining a set of profile characteristics for at least one field of said first database using said profiling information, wherein the set of profile characteristics includes a cardinality for a particular field of said second database and an associated fill rate based on a percentage of field values across all records of said second database that are not null for that particular field;

generating randomized test data for said at least one field of said first database conforming to said set of profile characteristics;

adding said randomized test data to said first database; and performing at least one test to validate said existing schema of first database using said randomized test data.

2. The computer-implemented method of claim 1, wherein said set of profile characteristics is determined by performing statistical analysis on at least one field of said second database.

3. The computer-implemented method of claim 1, wherein said set of profile characteristics comprises a sparseness value of at least one field of said second database.

4. The computer-implemented method of claim 1, wherein said set of profile characteristics comprises a dictionary comprising real values from said real data stored in said second database.

5. The computer-implemented method of claim 1, wherein said set of profile characteristics comprises a dictionary associated with a domain associated with at least one field of said second table.

6. The computer-implemented method of claim 1, wherein said set of profile characteristics comprises a number of multi-value inputs for at least one field of said second database.

7. The computer-implemented method of claim 1, wherein said set of profile characteristics comprises a number of qualified link inputs for at least one field of said second database.

8. The computer-implemented method of claim 1, wherein said set of profile characteristics comprises a number of child nodes for at least one field of said second table.

9. A non-transitory computer-readable medium encoded with computer-executable instructions for generating test data for testing data dependent applications, verifying schemas and sizing systems, wherein execution of said instructions by a computer processor will cause the processor to execute a method, the method comprising:

connecting to a first database;

obtaining an existing schema associated with said first database comprising at least one table;

connecting to a second database;

obtaining profiling information from said second database comprising real data stored in said second database;

performing a statistical analysis on at least one field of said second database to automatically determine a set of profile characteristics for at least one field of said first database using said profiling information, wherein the set of profile characteristics includes an associated fill rate based on a percentage of field values across all records of said second database that are not null for that particular field;

generating randomized test data conforming to said set of profile characteristics; and adding said randomized test data to said first database; and performing at least one test to validate said existing schema of first database using said randomized test data.

10. The computer-readable medium of claim 9, wherein said set of profile characteristics comprises a sparseness value of at least one field of said second database.

11. The computer-readable medium of claim 9, wherein said set of profile characteristics comprises a dictionary comprising real values from said real data stored in said second database.

12. The computer-readable medium of claim 9, wherein said set of profile characteristics comprises a dictionary associated with a domain associated with at least one field of said second table.

13. The computer-readable medium of claim 9, wherein said set of profile characteristics comprises a number of multi-value inputs for at least one field of said second database.

14. The computer-readable medium of claim 9, wherein said set of profile characteristics comprises a number of qualified link inputs for at least one field of said second database.

15. The computer-readable medium of claim 9, wherein said set of profile characteristics comprises a number of child nodes for at least one field of said second table.

* * * * *